United States Patent [19]

Grand-Perret et al.

[11] Patent Number: 4,482,813
[45] Date of Patent: Nov. 13, 1984

[54] REGULATOR SYSTEM FOR A DIESEL ELECTRIC LOCOMOTIVE

[75] Inventors: Philippe Grand-Perret, Paris; Bernard Lerouge, Chatou, both of France

[73] Assignee: Alsthom-Atlantique, Paris, France

[21] Appl. No.: 478,770

[22] Filed: Mar. 25, 1983

[30] Foreign Application Priority Data

Mar. 26, 1982 [FR] France ................................ 82 05162

[51] Int. Cl.³ .......................... H02P 5/00; B60I 11/04
[52] U.S. Cl. ..................................... 290/40 R; 290/7;
290/14; 290/17; 318/139; 318/140
[58] Field of Search ...................... 290/7, 9, 11, 14, 17,
290/19, 21, 24, 25, 32, 34, 40, 40 R, 40 A, 40 B,
40 C, 40 F, 40 X, 51; 318/139, 140

[56] References Cited

U.S. PATENT DOCUMENTS

| | | | |
|---|---|---|---|
| 3,263,142 | 7/1966 | Adoutte et al. | 290/14 X |
| 3,325,650 | 6/1967 | Barnes | 290/40 R |
| 3,370,218 | 2/1968 | Merz | 318/140 X |
| 3,565,202 | 2/1971 | Evans et al. | 290/17 X |
| 3,878,400 | 4/1975 | McSparran | 290/14 |
| 4,292,531 | 9/1981 | Williamson | 290/14 |

Primary Examiner—J. V. Truhe
Assistant Examiner—Paul S. L. Ip
Attorney, Agent, or Firm—Sughrue, Mion, Zinn, Macpeak & Seas

[57] ABSTRACT

A regulator system for both the Diesel and the electric portions of a Diesel electric locomotive allowing more reliable operation at all locomotive speeds. Said regulator has a regulator to regulate the electric power by varying the excitation (43) of the main generator by means of orders coming from a driver control (1, 8) which set a reference current level and (17) a voltage reference level (19) for the main generator and a Diesel engine gas oil reference level (18). These levels are compared with measurements of true corresponding values (24, 30, 27) and orders (43) for increasing or decreasing excitation are delivered so that the excitation of the main generator remains inside the scope delimited by the various reference levels and a Diesel power regulator which sends out orders to increase or decrease the gas oil injection in accordance with a predetermined Diesel engine speed/injection law and in comparison with the true measurements of the injection and of the Diesel engine speed.

4 Claims, 2 Drawing Figures

REGULATOR SYSTEM FOR A DIESEL ELECTRIC LOCOMOTIVE

The present invention relates to a regulator system for a locomotive having a Diesel engine driving a main generator which supplies electric power to the traction motors which drive the locomotive, said regulator system varying gas oil injection into the Diesel engine as well as the excitation of the main generator starting from numerous parameters such as the speed of the Diesel engine, the speed of the locomotive, boost or supercharger feed pressure, and the temperature of the power unit, etc., so as to obtain optimum operation conditions.

BACKGROUND OF THE INVENTION

At constant speed, the power delivered by the Diesel engine and as would be made available at the terminals of an ideal main generator could be plotted in rectangular coordinates of voltage against current. The result would be a hyperbola in the first quadrant with its concave portion looking upwards; indicating constant power output such that the voltage times the current equals a constant. It is also known that real main generators have voltage/current characteristic curves within the first quadrant with the concave portion facing downwards thereby intersecting the hyperbola of the Diesel engine at two points for the same Diesel engine speed. Regulation systems try to reconcile the two characteristics so as to make best use of the power delivered by the Diesel engine.

Indeed, the aim of regulation is to ensure that at all times, the generator supplies electric power which is always equal to and is never greater than the power supplied by the Diesel engine so that the engine can be used to maximum effect and need never be in a situation where it reaches its upper limit, in which case it would slow down. In conventional regulator systems, self-regulation is used which is based on the fact that when the Diesel engine speed drops, the speed of an auxiliary generator driven by the Diesel engine also drops, thereby causing a reduction in the excitation current and therefore in the power of the main generator. External regulation is also used and is operated by a rheostat which controls and accentuates the reduction in excitation current of the main power unit when the Diesel engine power tends to increase relative to a value fixed as a function of the Diesel engine speed.

The regulation systems used up till now have the disadvantage of taking effect only in the hyperbolic zone Diesel engine characteristic in electric co-ordinates, but not in the substantially rectilinear high-current/low voltage or high-voltage/low-current branches disposed on either side of the secant points of the hyperbola and merging with portions of the load curve of the main generator. In other words, prior art regulator systems have the disadvantage of not acting as regulators when starting up a train or when the train is running at high speed.

In prior art regulator systems for Diesel electric locomotives, there is a control handle operated by the driver and which sets a Diesel engine rotation speed. The control "handle" is sometimes a "wheel", but the term "handle" is used for either in this specification. In prior art systems, there is also a Diesel engine power regulator which makes the injection of gas oil vary as a function of a comparison between the measured true rotation speed of the Diesel engine and the value set by the driver, the aim of the increase or decrease of injection being to maintain the required rotation speed at the set constant value. Prior art Diesel engine power regulators use equipment of hydraulic design.

In prior art regulator systems, there is also an excitation regulator for the main generator; said regulator regulates the generators excitation as a function of the Diesel engine speed as measured by means of a tachometer. Its function is to operate in such a way that for a given speed, the power supplied by the main generator is always less than or equal to the power which the Diesel engine can supply.

One prior art system is illustrated by U.S. Pat. No. 3,370,218.

It can be seen from the above that in prior art systems, the disadvantage of regulating the excitation of the main generator as a function of the Diesel engine speed is that it limits Diesel engine power only in a middle zone which corresponds to said hyperbola, since setting the Diesel engine speed leads, in actual fact, to setting the Diesel engine power. The disadvantage of the prior art system is therefore that is does not function in all cases which may occur during operation.

Preferred embodiments of the present invention remedy these drawbacks. Indeed, they allow a choice of parameters which enable the power brought into play at any speed and on starting up the locomotive.

SUMMARY OF THE INVENTION

The present invention provides a regulator system for a locomotive having a Diesel engine driving a main generator which supplies electric power to the traction motors which drive the locomotive, said regulator system having a first regulator to regulate the electric power of said main generator and a second regulator to regulate the Diesel engine, wherein said first electric power regulator is controlled by at least one driver control operated by the engine driver and setting a multiple purpose reference level from which particular reference levels are derived, establishing mainly a main generator current reference level, a main generator voltage reference level, a Diesel engine injection reference level, each compared in a comparator with a signal for measuring said true current, true potential or true injection, each of the difference signals resulting from the measured level and the reference level being introduced into an integrator in such a way that the integrator delivers an increase order to a main generator excitation device if said measurement signals are lower than said reference levels and a decrease order if at least one of said measurement signals is equal to or higher than the corresponding reference level and wherein the Diesel engine power is regulated automatically by establishing a temporary reference level for the speed of the power generator on measuring the injection of the gas oil in the Diesel engine in accordance with a predetermined speed injection law, then of a permanent Diesel engine speed reference level after integration of an external Diesel engine speed reference level, said permanent speed reference level being compared with a signal for measuring the true Diesel engine speed in a comparator which supplies orders to a injection pump positioning device, namely, an injection increase order if said true Diesel engine speed measurement signal is lower than said permanent Diesel engine speed reference and an injection decrease order if said Diesel engine true speed measurement signal is higher than said permanent Diesel engine speed reference level.

Preferably said driver control is a pulse sender and-/or an analog sender.

Advantageously said multiple reference level displayed by the sender is able to receive a reduction order if the boost speed is not sufficient or if the electric power unit overheats.

In a preferred embodiment the unit for establishing the Diesel engine speed temporary reference level is able to receive an order to move smoothly towards the smaller injection range of the Diesel engine speed injection curve for booster speed pressures which are too low or power unit temperatures which are too high.

BRIEF DESCRIPTION OF THE DRAWINGS

An embodiment of the present invention given purely by way of a non-limiting illustration is described with reference to the accompanying drawings, in which.

MORE DETAILED DESCRIPTION

Figure 1:
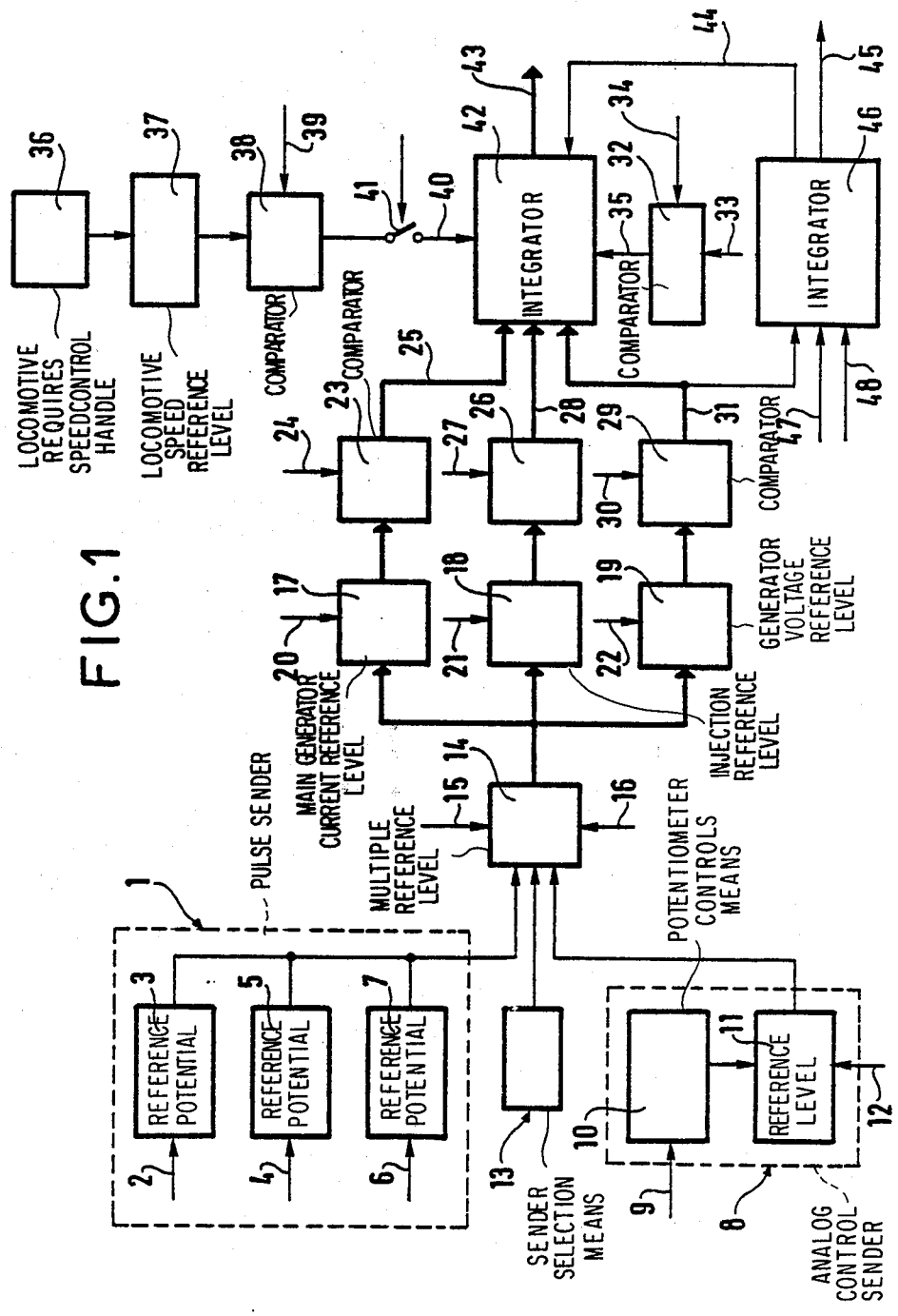
FIG. 1 is a block diagram of the electric power regulator system through which orders are sent from a control handle.

FIG. 1 illustrates a pulse sender 1 operated by the driver by means of a drive control handle and, said sender operating electronically as a function of the time during which pressure is applied to the handle. Thus, an increase on order 2 causes an increase 3 of a reference potential up a slope f(t) obtained by a capacitor charge, for example, while a decrease on order 4 reduces the reference potential 5 down a slope f(t) and a switch-off order 6 immediately sets the reference potential 7 to zero.

The driver also has an analog control sender 8 formed by a potentiometer by which various values of reference potential may be set by the driver. Position 9 of the potentiometer controls means 10 for limiting the speed at which the reference potential may vary, the limiting means 10 being such that reference level 11 depends on the position of the potentiometer 9 if said position is stable and can be reset at zero immediately when the driver switches on the rapid decrease contact. The driver can use the pulse sender 1 or the analog sender 8 at will by means of sender selection means 13.

Figure 2:
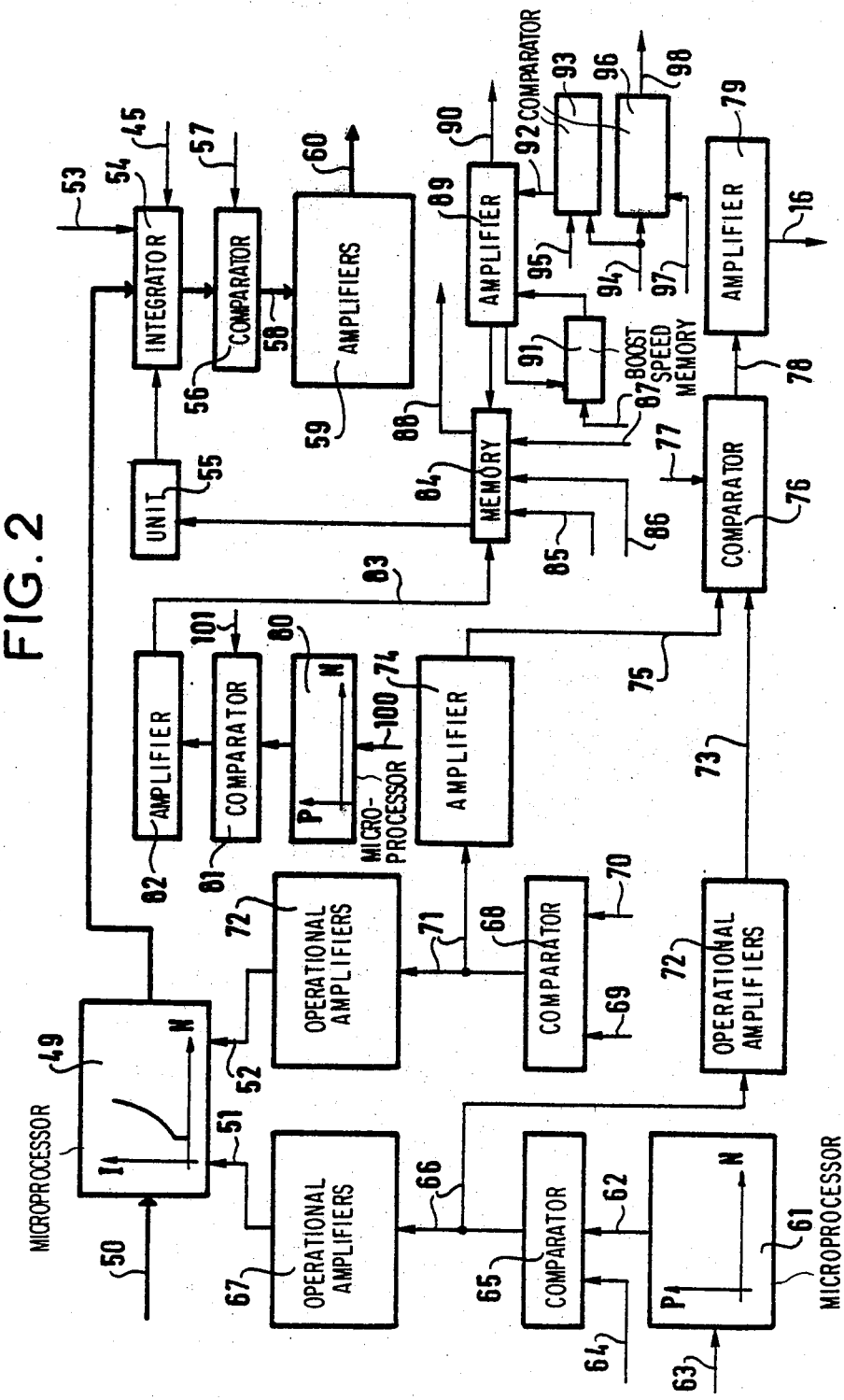
FIG. 2 is a block diagram of the Diesel engine power regulator system.

Data coming from the pulse sender 1 or from the analog sender 8 and generated by an order from the sender selector 13 is applied, for example, via electronic gates (not illustrated) to a unit 14 (e.g. a capacitor) which establishes the value of the reference potential. Which is referred to as a "multiple" reference level on account of the plurality of factors acting upon it and upon which it acts. Said multiple reference level 14 can either be set to zero as shown at 15 subsequent to stoppage of the Diesel engine or else it can receive reduction orders 16 coming from the Diesel engine power regulator (FIG. 2). Depending on the solution chosen, the reduction orders 16 can be permanent or only temporary, the value of the multiple reference level 14 resuming its initial value when the cause of the reduction disappears. The value of the multiple reference level 14 serves to establish a plurality of particular reference levels e.g. by means of memories and constituted by a first reference level 17, determining the main generator current, by a second reference level 18 for determining the injection to the Diesel engine, and by a third reference level 19 determining the alternator voltage. To establish the respective reference levels 17, 18 and 19, respective parameters such as limit values to account for slippage or shunting, for example, are also established.

The alternator current reference level 17, when established, passes into a comparator 23 whose main components are operational amplifiers and which also receives a true measurement 24 of the alternator current. A signal 25 which gives the difference between the measured current level and the reference current level appears at the output of the comparator 23.

The injection reference level 18, when established, passes into a comparator 26 whose main components are operational amplifiers and which also receives a true measurement 27 of the injection to the Diesel engine. A signal 28 which gives the difference between the measured injection potential and the Diesel engine gas oil injection reference level appears at the output of the comparator 25.

When established, the generator voltage reference level 19 passes into a comparator 29 whose main components are operational amplifiers and which also receives the true measurement 30 of the generator voltage. A signal 31 which gives the difference between the measured voltage and the main voltage reference level appears at the output of the comparator 29.

Also, a comparator 32 compares a maximum excitation current reference level 33 with a true measurement 34 of the excitation current and the main or auxiliary pulse generator excitation current level (obtained by a current probe) and delivering a signal 35 showing the difference between the measurement of the main or auxiliary pulse generator excitation current and the maximum excitation current level.

Optionally, there may be a control 36 for setting the required locomotive speed by means of a potentiometer and delivering a locomotive speed reference level 37 equal to the position of handle 36 whose output signal is compared in a comparator 38 with a locomotive speed measurement signal 39 obtained by magnetic sensors, for example. A signal 40 indicating the difference between the locomotive speed as measured and the set reference level for said speed is switched in or out of service by means of a switch 41 according to whether a locomotive speed setting is or is not to be introduced into the regulation process.

The difference signals 25, 28, 31, 35 and optionally 40 are applied to an integrator 42 having five inputs controlled by AND gates.

The integrator 42 is designed to send an increase order if all the difference signals indicate that the measured values are lower than the reference levels and to send a decrease order if at least one of the measurements is equal to or higher than its reference level. Increase or decrease orders 43 are applied to the exciter of the main generator, which exciter could be a field magnet of the auxiliary alternator associated with the main alternator, or it could be an electronic regulator device. The result which is required to be obtained is to make the generator excitation current vary mostly without overstepping the limits of generator voltage and current and of Diesel engine injection requirements. The increase and decrease orders 43 can have an imposed speed of variation.

The integrator 42 also receives a progression-blocking order 44 (blocking any increase in excitation) from an integrator 46 which also generates a Diesel engine acceleration order 45. The integrator 46 receives both the main generator voltage difference signal 31 and a measurement signal 47 of the excitation current from the main generator in addition to a measurement signal 48 of the Diesel engine speed. During the tension-regulating mode of operation beyond a given excitation threshold, the function of the integrator 46 is to block the excitation increase by means of an order 44 and to send a Diesel engine acceleration order 45 until the maximum Diesel engine acceleration value is reached, since the main generator voltage is proportional to its rotation speed.

FIG. 2 is a schematic block diagram illustrating the completely automatic regulation of Diesel engine power by means of electronic components.

Thick lines are used to show the main gas oil injection variation control means operating as a function of the rotation speed of the Diesel engine and of a predetermined injection-speed regulation curve which the regulation system must follow as closely as possible.

A microprocessor 49 or the like serves to establish the temporary Diesel engine reference speed according to a predetermined speed law N=f (injection I) on receiving an electric signal 50 which is characteristic of the measurement of the gas oil injection (which measurement is made by solenoids energized at fixed frequencies, for example). The microprocessor 49 also receives correction orders 51 and 52 which will be described in detail hereinafter.

The temporary Diesel engine reference speed as well as the external Diesel engine reference speed 53 allow the final reference speed to be established in an integrator 54, for example, it being possible to reduce said reference speed to zero on an order 55 generated in a way which is described in detail hereinafter. The integrator 54 also receives the Diesel engine acceleration order 45 (FIG. 1) during operation in tension regulation mode when the excitation threshold is reached. The final reference speed 54 is sent to a comparator 56 equipped with operational amplifiers so as to compare the reference signal with a Diesel engine speed measurement signal 57 obtained by means of a magnetic sensor or by means of the main alternator or auxiliary alternator frequency signal. At the output of the comparator 56, the difference 58 between the measurement 54 and the reference signal 57 allows an increase order 60 to be delivered by means of amplifiers 59 if the measurement is lower than the reference level and a decrease order 60 to be likewise delivered if the measurement is higher than the reference level. The increase or decrease orders 60 are sent to a Diesel engine injection pump order positioning means and serve to increase or decrease the injection entirely automatically.

The subsidiary regulation functions for reducing the required power in the case of overheating or lack of boost pressure are performed without affecting electric power if the engine power allows this.

A microprocessor 61 or the like is used for this purpose to establish a minimum reference boost limit pressure 62 as a function of the Diesel engine speed, making use of a measurement of the Diesel engine speed 63, said speed being obtained by a magnetic sensor for example and sending a pressure signal using a predetermined pressure law P=f (speed N). The reference signal 62 and a boost pressure measurement signal 64 (obtained by an analog sensor) are introduced into a comparator 65 which compares the measurement signal 64 with the reference signal 62 and sending a signal which indicates the difference 66 between said two signals 62 and 64. Operational amplifiers 67 receive a difference signal 66 and their function is to provide a correction order 51 to the microprocessor 49. The correction order 51 is an order to move smoothly towards the smaller injection range of the Diesel engine speed/Diesel engine injection curve $I=f(N)$ as long as the pressure 61 is lower than the reference level 62.

As far as concerns regulation controlled by temperature, a comparator 68 compares a signal 69 which indicates the measurement of the electric power unit with a temperature reference signal 70 and sends a signal 71 indicating the difference between the signals 69 and 70. The difference signal 71 is sent to operational amplifiers 72 whose function is to supply a correction order 52 to the microprocessor 49. The correction order 52 is an order to translate the fixed value towards the smaller injection range of the Diesel engine speed Diesel engine injection curve, with $I=f(N)$ as long as the temperature measurement 69 is higher than the reference temperature 70.

The signals 66 and 71 which indicate the difference between the measurement and the reference level respectively serve also to establish a maximum Diesel engine speed threshold within the limits of pressure and of temperature. Thus, the difference signal 66 is applied to an amplifier 72 which delivers a maximum Diesel engine speed threshold reference signal 73 if the pressure measurement 64 is lower than the reference level 62. Likewise, the difference signal 71 is applied to an amplifier 74 which delivers a maximum Diesel engine speed threshold reference signal 75 if the temperature measurement signal 69 is higher than the temperature reference level 70.

The two reference signals 73 and 75 (Diesel engine maximum speed thresholds) are applied to a comparator 76 which compares the reference signals 73 and 75 with a Diesel engine speed measurement signal 77, said comparator 76 delivering a difference signal 78 between the Diesel engine speed measurement 77 and one of the reference signals 73 and 75. The difference signal 78 allows a regression order 16 for the multiple reference value 14 (FIG. 1) to be generated in the amplifier 79 if the Diesel engine speed measurement 77 is higher than one of the reference signals 73 or 75. In accordance with another advantageous solution, the reduction orders 16 can be final or only temporary, the value of the multiple reference value 14 resuming its initial level when the cause or reduction disappears.

Thus, the torque reductions which are necessary in the case of overheating and of lack of boost pressure result in smooth variation towards the smallest injection region of the injection/Diesel engine speed curve. To compensate the downward shift of the power curve as a function of speed, the regulator controls a Diesel engine rotation speed increase up to the limit value 73 or 75 so as to compensate the torque reduction and to maintain the constant power within the limits of the engine's capabilities.

To limit the speed increase, when the Diesel engine reaches a rotation speed limit, the device reduces the multiple reference value coming from the control handle so as not to exceed the Diesel engine capabilities. In previous systems, overheating or a lack of boost pressure resulted in a loss of locomotive power in all cases. With the regulation system in accordance with the invention, said systematic loss of power no longer exists except at maximum Diesel engine speed.

The regulation system also includes equipment for displaying Diesel engine signalling and tachometry data. These signalling limits are described in the remainder of the present description.

A microprocessor 80 or the like allows an engine oil lower limit reference pressure to be established as a function of the Diesel engine speed in accordance with a predetermined oil pressure curve P=f (Diesel engine speed N) on receiving a Diesel engine speed measurement signal 100. A comparator 81 compares the difference between a measurement 101 and the reference signal generated by the microprocessor 80 and delivers a stop order 83 to an amplifier 82 if the measurement 101 is lower than the reference signal generated by the microprocessor 80. The stop order 83 is transmitted to a Diesel engine stop memory 84 which, in the case of a Diesel engine stop order, transmits said order to a unit 55. The memory 84 also comes into action in the case of a Diesel engine speed measurement disappearance signal 85 or of an external stop order 86 controlled by the driver. The Diesel engine stop memory 84 can be reset by a reset order 87 on starting up. The Diesel engine stop memory 84 provides and order for a Diesel engine stop signal 88 which can be used by the driver.

An amplifier 89 supplies Diesel boost speed data 90 when the measurement is higher than the reference potential on receiving a difference signal 92 obtained in a comparator 93 which compares the Diesel engine speed 94 with a Diesel boost speed 95. A boost speed memory 91 which can be reset when the starting up order 87 is received holds the data until a new starting up order is given. The amplifier 89 also gives a stop order to the memory 84.

A comparator 96 which compares speed threshold reference potentials 97 with the Diesel engine speed measurement 94 supplies Diesel engine speed data 98.

The regulator system in accordance with the invention consequently performs multiple functions. On the locomotive, it replaces not only the Diesel engine power regulator but also the main generator exciter regulator, the active electric portion of the anti-skid device, the constant speed device, the speedometer of the Diesel engine (supply of the revolution counter and speed thresholds including of the Diesel engine boost speed) and it allows gas oil instantaneous and cumulative consumption indicators to be energized.

We claim:

1. A regulator system for a locomotive having a Diesel engine including an injection pump positioning device, said engine driving a main generator which supplies electric power to the traction motors which drive the locomotive, said regulator system comprising:
   a first electric power regulator to regulate the electric power of said main generator and a second regulator to regulate the Diesel engine,
   at least one driver control operated by the engine driver for controlling said first electric power regulator including means for setting a multiple purpose reference level from which particular reference levels are derived, establishing mainly a main generator current reference level, a main generator voltage reference level, a Diesel engine injection reference level,
   a comparator for comparing each said level with a signal for measuring said true current, true potential or true injection, respectively,
   an integrator,
   each of the difference signals resulting from the measured level and the reference level being introduced into said integrator in such a way that the integrator delivers an increase order to a main generator excitation device if said measurement signals are lower than said reference levels and a decrease order if at least of said measurement signals is equal to or higher than the corresponding reference level, and
   means for establishing a temporary reference level for the speed of the power generator on measuring the injection of the gas oil in the Diesel engine in accordance with a predetermined speed injection law, then of a permanent Diesel engine speed reference level after integration of an external Diesel engine speed reference level to regulate the Diesel engine power automatically,
   a second comparator for comparing said permanent speed reference level with a signal for measuring the true Diesel engine speed with the output of said comparator supplying an injection increase order if said true Diesel engine speed measurement signal is lower than said permanent Diesel engine speed reference level and an injection decrease order if said Diesel engine true speed measurement signal is higher than said permanent Diesel engine speed reference level to said injection pump positioning device.

2. A regulator system according to claim 1, wherein said driver control is a pulse sender and/or an analog sender.

3. A regulator system according to claim 2, wherein said means for setting said multiple reference level is displayed by the sender, and said system further includes means for supplying to said multiple reference level setting means a reduction order if the boost speed is not sufficient or if the electric power unit overheats.

4. A regulator system according to claim 1, wherein said means for establishing the Diesel engine speed temporary reference level includes means for receiving an order to move smoothly towards the smaller injection range of the Diesel engine speed injection curve for booster speed pressures which are too low or power unit temperatures which are too high.

* * * * *